US 8,493,000 B2

(12) United States Patent
Jungwirth

(10) Patent No.: US 8,493,000 B2
(45) Date of Patent: Jul. 23, 2013

(54) METHOD AND SYSTEM FOR DRIVING LIGHT EMITTING ELEMENTS

(75) Inventor: Paul Jungwirth, Burnaby (CA)

(73) Assignee: Cooledge Lighting Inc., Burnaby (CA)

( * ) Notice: Subject to any disclaimer, the term of this patent is extended or adjusted under 35 U.S.C. 154(b) by 336 days.

(21) Appl. No.: 12/982,758

(22) Filed: Dec. 30, 2010

(65) Prior Publication Data

US 2011/0163682 A1    Jul. 7, 2011

Related U.S. Application Data

(60) Provisional application No. 61/292,137, filed on Jan. 4, 2010, provisional application No. 61/315,903, filed on Mar. 19, 2010, provisional application No. 61/363,179, filed on Jul. 9, 2010, provisional application No. 61/376,707, filed on Aug. 25, 2010, provisional application No. 61/390,128, filed on Oct. 5, 2010, provisional application No. 61/393,027, filed on Oct. 14, 2010.

(51) Int. Cl.
    *H05B 37/00*    (2006.01)
(52) U.S. Cl.
    USPC .......................... 315/307; 315/192; 315/308
(58) Field of Classification Search
    USPC ............ 315/291, 307, 308, 246, 224, 185 R, 315/192, 193, 191, 161
    See application file for complete search history.

(56) References Cited

U.S. PATENT DOCUMENTS

| 5,598,068 A | 1/1997 | Shirai |
| 6,225,912 B1 | 5/2001 | Tanaka et al. |
| 6,621,235 B2 | 9/2003 | Chang |
| 7,498,754 B2 | 3/2009 | Masood |
| 7,638,954 B2 * | 12/2009 | Kunimatsu et al. ........... 315/291 |
| 7,663,599 B1 | 2/2010 | Lin et al. |
| 2005/0225515 A1 | 10/2005 | Tsuchida et al. |
| 2007/0216320 A1 | 9/2007 | Grivas et al. |
| 2007/0273681 A1 | 11/2007 | Mayell |
| 2008/0143266 A1 | 6/2008 | Langer |
| 2008/0202312 A1 | 8/2008 | Zane et al. |
| 2008/0252222 A1 | 10/2008 | Cusinato et al. |
| 2008/0272651 A1 | 11/2008 | Fong |
| 2008/0290906 A1 | 11/2008 | Chou et al. |
| 2009/0091263 A1 | 4/2009 | Janning |
| 2009/0096739 A1 | 4/2009 | Lan et al. |
| 2009/0128045 A1 | 5/2009 | Szczeszynski et al. |
| 2009/0187925 A1 | 7/2009 | Hu et al. |
| 2009/0195163 A1 | 8/2009 | Nguyen et al. |
| 2009/0225021 A1 | 9/2009 | Ye et al. |
| 2009/0261743 A1 | 10/2009 | Chen et al. |
| 2009/0295358 A1 | 12/2009 | Lee et al. |
| 2010/0019693 A1 * | 1/2010 | Hoogzaad et al. ............ 315/294 |

FOREIGN PATENT DOCUMENTS

EP    0342814    11/1989

OTHER PUBLICATIONS

International Search Report filed in co-pending PCT application No. PCT/CA2010002047 filed on Dec. 31, 2010.

* cited by examiner

*Primary Examiner* — David H Vu
(74) *Attorney, Agent, or Firm* — Bingham McCutchen LLP

(57) ABSTRACT

A system topology and circuit design for efficiently and stably driving currents through strings of solid state light emitting elements by providing current sources that are controlled by a stable voltage reference.

26 Claims, 14 Drawing Sheets

US 8,493,000 B2

METHOD AND SYSTEM FOR DRIVING LIGHT EMITTING ELEMENTS

This patent application claims the benefit of U.S. provisional application Nos. 61/292,137 and 61/315,903, respectively filed Jan. 4, 2010 and Mar. 19, 2010. The disclosures of said provisional applications are hereby incorporated herein by reference thereto.

TECHNICAL FIELD

The subject matter of the present invention is directed generally to driving solid state lighting elements and, more particularly, is concerned with a method and system for driving light emitting elements.

BACKGROUND ART

Illumination based on semiconductor light sources, such as light-emitting diodes (LEDs), offers an efficient and long-lived alternative to fluorescent, high-intensity discharge and traditional incandescent lamps. Many LED light sources employ high powered LEDs, which pose thermal management problems and other related problems. Another drawback with state of the art LED devices is a high initial cost.

Small semiconductor die including those with sizes of 300 μm or smaller present several benefits in applications such as broad area lighting, concentrator photovoltaics and electronics. Light emitting elements with a lateral dimension equal or greater than 300 μm may also be used when driven at low currents.

Most commonly available LED drivers and drive circuits are designed to power relatively small numbers of LEDs (eg: 5 to 10) at moderate to high levels of current (eg: 20 mA-1 A) with a low voltage DC or constant current source. The total LED power of these arrays is therefore typically only a few watts. These drive solutions are not appropriate for driving higher power arrays of LEDs, for example an array of hundreds or even thousands of low power micro-LEDs with a total LED power exceeding for example 10 watts. Micro-LEDs typically have the same forward voltage as a standard or high flux LED, but the current required to drive a micro-LED is much smaller. For example, the drive current for a micro-LED is of the order of 5 mA or less. Even employing the lowest cost "multi-LED" linear regulator drive circuits currently on the market, with up to eight outputs each of up to 20 mA at ~24 VDC, would require hundreds of such circuits, which would be prohibitively expensive and not very efficient.

Other, more expensive, high efficiency, switching regulator type LED drivers available on the market can efficiently output much higher currents, at different voltages supporting a string of a few LEDs (eg: 24 VDC, 36 VDC, 75 VDC, etc), but since micro-LEDs require such low current, in order to use these high current drivers it would necessitate grouping hundreds of micro-LEDs in parallel which would lead to reliability issues, be overly large due to all the inductors, and still not be very cost effective. Therefore, in order to cheaply and reliably drive hundreds or thousands of micro-LEDs with minimal component count and space usage and high efficiency, a significantly different topology and circuit design is required. This topology and circuit design is well suited to efficiently drive any array of LEDs with a medium to high level of total LED power. In addition, it may be applied to driving arrays of other light emitting elements such as laser diodes, or other semiconductor devices.

SUMMARY OF THE INVENTION

The subject matter of the present invention provides a drive circuit and system topology for inexpensive but accurate current control of an array of light emitting elements. It includes a driving circuit having controlled current sources that provide currents for driving strings of series connected light emitting elements. The circuit has a stable voltage reference that is capable of sourcing milliamps of current to multiple current sources without voltage droop. A DC voltage source with an output voltage higher than the total forward voltage of the light emitting elements in each string can be used.

The drive circuit is applicable for light emitting element arrays of medium to high total power, including but not limited to using light emitting elements with typical forward currents of 5 mA or less and the solution can be scaled to accommodate an array of up to or exceeding 10,000 light emitting elements.

In one aspect of the present invention, a method for driving light emitting elements includes the steps of providing a voltage reference to a plurality of parallel-connected current sources, driving current from each current source through a respective one of a plurality of strings of light emitting elements wherein each current source is connected in series with one of the strings of light emitting elements, and taking up excess voltage not required by any one of the strings of light emitting elements.

In another aspect of the present invention, a system for driving light emitting elements includes a plurality of strings of light emitting elements, a plurality of current sources connected in parallel with each other, each of said current sources for providing current to one of said strings of light emitting elements, a voltage reference connected to said plurality of parallel-connected current sources for driving current from each of said current sources through a respective one of said strings of light emitting elements; and a plurality of excess voltage take-up elements each connected in series between one of said current sources and one of said strings of light emitting elements.

BRIEF DESCRIPTION OF THE DRAWINGS

For clarity, the drawings herein are not necessarily to scale, and have been provided as such in order to illustrate the principles of the subject matter, not to limit the invention.

DESCRIPTION OF EMBODIMENTS

The term semiconductor device includes light-emitting elements, which is any device that emits electromagnetic radiation within a wavelength regime of interest, for example, visible, infrared or ultraviolet regime, when activated, by applying a potential difference across the device or passing a current through the device. Examples of light-emitting elements include solid-state, organic, polymer, phosphor coated or high-flux light-emitting diodes (LEDs), micro-LEDs, laser diodes or other similar devices as would be readily understood. Without limiting the foregoing, micro-LEDs include LEDs with semiconductor die with a lateral dimension 300 micron or smaller. The output radiation of an LED may be visible, such as red, blue or green, or invisible, such as infrared or ultraviolet. An LED may produce radiation of a spread of wavelengths. An LED may comprise a phosphor for converting part of its output from one wavelength to another. An LED may comprise multiple LEDs, each emitting essentially the same or different wavelengths.

While descriptions of embodiments have been provided herein that relate to driving micro-LEDs, the subject matter of the present invention is also applicable to larger power LEDs and other light emitting elements as defined above.

LED String

The term "string" is one or more semiconductor die connected in series or parallel or a series-parallel combination. An "array" is an arrangement of strings.

Figure 1:
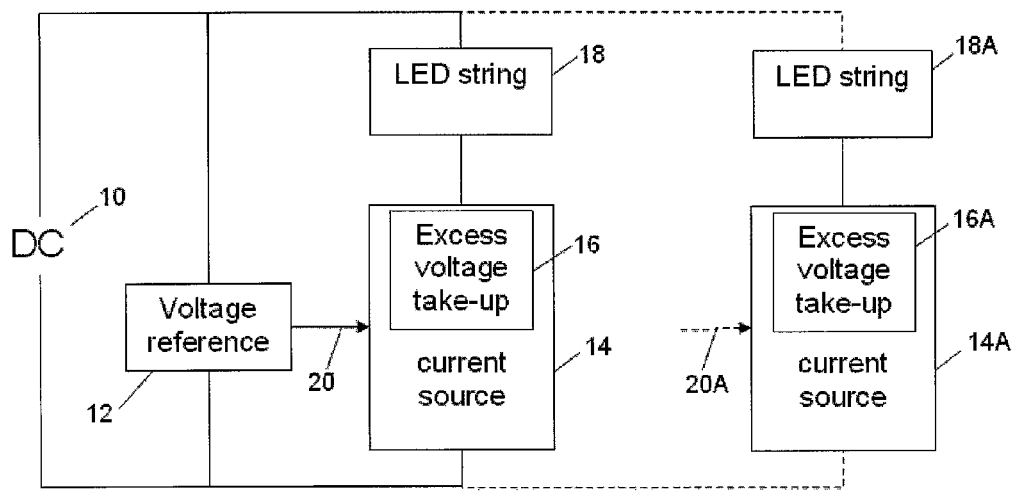
FIG. 1 is a basic block diagram illustrating a light emitting element drive circuit in accordance with the present invention.

Referring to FIG. 1, with a large number (n) of LEDs per string 18, 18A, and a known tolerance in forward voltage for individual LEDs, Vf_min to Vf_max, the larger the number n, the greater the possible variation in total string voltage and hence the higher the voltage source, V_DC 10 must be in order to ensure all LED strings 18, 18A light up. But statistically, as the number of LEDs per string increases, the chance of all the LEDs in one string having Vf=Vf_max decreases. Therefore, to set V_DC=n×Vf_max would lead to excessive power loss and system inefficiency. So for improved system efficiency, a new statistically realistic tolerance in the string voltage, Vstring_min to Vstring_max, can be calculated, for example, by multiplying the standard deviation, S, of the individual LED forward voltage by the square root of the number of LEDs to determine the adjusted standard deviation, S'. Then Vstring_min to Vstring_max can be determined based on the adjusted standard deviation, S', and percentage of LED distribution being used in the design—eg: 6-sigma=99.7% assuming a normal distribution. The Vstring_max value can then be used as the optimal voltage to be supplied by V_DC 10 which will ensure that the LEDs will light up, while minimizing the power losses in the current sources. This calculated voltage can be used as a way to optimize the number of LEDs per string and hence the overall system efficiency. One skilled in the art will realize that there are other ways to calculate a realistic tolerance in string voltage.

Figure 3:
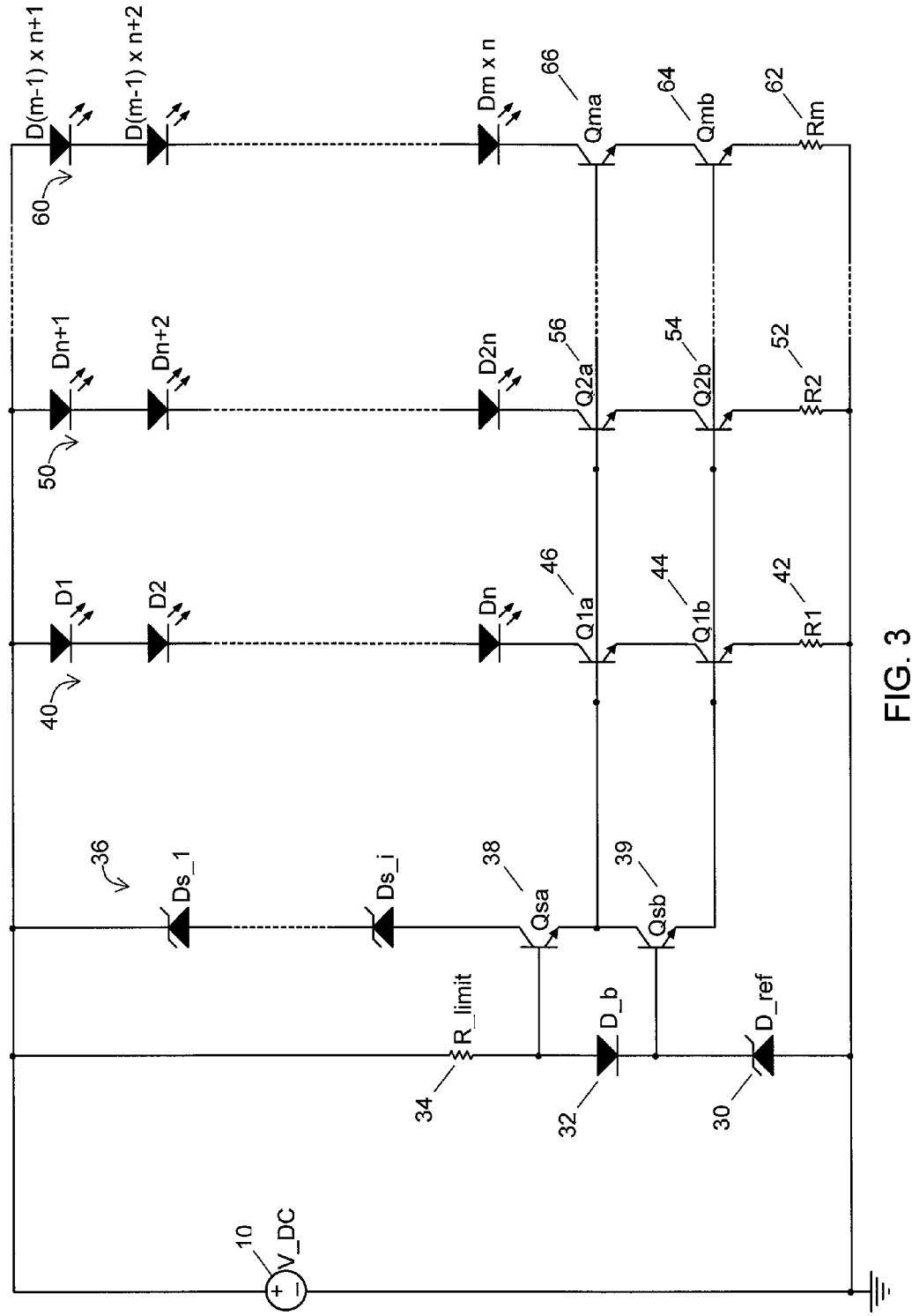
FIG. 3 is a schematic diagram illustrating a first exemplary embodiment of a light emitting element drive circuit in accordance with the present invention.

Referring to FIG. 3, an example of system topology shows the division of the total number (N=m×n) of LEDs to be driven into a number (m) of series strings 40, 50, 60 such that each string has the about the same number (n) of LEDs.

Voltage Reference

Referring again to FIG. 1, a voltage reference 12 is an electronic component or group of electronic components that can provide a reference voltage. A zener diode with a zener voltage is an example of an efficient component for establishing a reference voltage and hence the drive current for each LED string 18, 18A. The voltage reference 12 is used to control the drive current in an LED string, such as string 18, by controlling via connection 20, the current through a current source 14. Additional LEDs in string 18A, for example, may be supplied with current from current source 14A that is controlled by connection 20A to the voltage reference 12.

An example of a voltage reference is the zener diode D_ref 30 in FIG. 3. The voltage supplied to the current source is $$V(D\_ref) - 2Vbe$$

where V(D_ref) is the voltage of the zener diode D_ref 30 and Vbe is the base-emitter voltage drop of transistors Qsb 39 and Q1b 44.

Current Source

A current source 14 in FIG. 1 is an electronic component or group of electronic components that can provide a stable current. As an example, the current source 14 may be formed by a transistor and resistor, the current through which is set by the voltage output from the voltage reference 12. The current source 14 provides controlled current through LED string 18.

For example, in reference to FIG. 3, the current through the current setting resistor 42 with resistance R1 is equal to:

$$(V(D\_ref) - 2Vbe)/R1$$

where V(D_ref) is the voltage of the zener diode D_ref 30 and Vbe is the base-emitter voltage drop of transistor Qsb 39 and transistor Q1b 44. Assuming a typical small signal transistor is used with a current gain on the order of about 100, the base current will be negligible, so the current through the current setting resistor 42 is the current that flows through the LED string 40.

An aspect of the drive system topology which relates to system efficiency is the fact that it uses linear current sources, as opposed to more expensive switching converters. Normally, linear current sources are much less efficient than a well designed switching DC/DC converter. However, for a system with a large number of LEDs and the possibility of using long series strings, the relative inefficiency of linear current sources can be minimized. As the number of LEDs per string is increased, the ratio of power supplied to the LEDs to the power dissipated in the linear current source increases.

Figure 2:
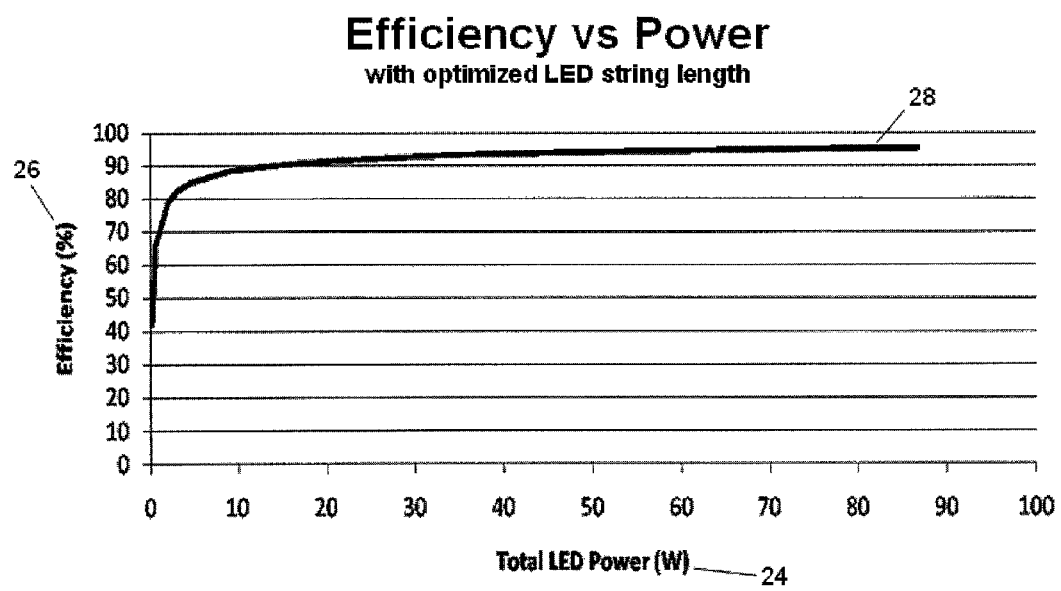
FIG. 2 is a graph of system efficiency vs power for optimized string length.

With more LEDs in a string, a larger "buffer" voltage must be built into the system to allow for larger differences in string voltage, and this tends to reduce the system efficiency. By balancing several parameters, including but not limited to increasing the number of LEDs in a string to improve efficiency while avoiding the need for an excessive buffer voltage, an optimal string length can be determined which maximizes the system efficiency and which is higher than would be expected for known systems using a linear drive topology. An example is provided in FIG. 2, which shows a curve 28 representing system efficiency 26 vs power 24. When the string length is optimized for a given set of LEDs with a given total LED power, the efficiency can be maximized. As the total LED power increases beyond a few watts, the system efficiency rapidly increases and approaches 97%.

Excess Voltage Take-Up

As there is sometimes a difference between the voltage supplied by source 10 in FIG. 1 and the voltage required by a LED string 18 and its corresponding current source 14, for example, the "buffer voltage" mentioned previously, excess voltage can be taken up by an additional component or components 16. Likewise, the buffer voltage for string 18A can be taken up by component(s) 16A. The excess voltage may be taken up by the current source itself or by separate components additional to those in a current source. Referring to FIG. 3, the transistor Q1a 46 takes up the excess voltage not required for LED string 40. In this way, the transistor heating in the Q1a 46 due to excess power dissipation will not affect the base-emitter voltage of the transistor Q1b 44 and hence the current set by current source and flowing through LED string 40 will remain stable.

First Embodiment

Referring again to FIG. 3, in a first exemplary embodiment of a light emitting element drive circuit of the present invention the voltage source V_DC 10 is a DC voltage supply. The zener diode D_ref 30 with zener voltage V(D_ref) establishes the reference voltage and hence the drive current for each LED string 40, 50, 60. The LED drive current in a given string is set to the desired level by current setting resistors R1 through Rm (42, 52, 62) according to the following relation:

$$I\_LED = (V(D\_ref) - 2Vbe)/R$$

where R is the resistance of a given current setting resistor R1 through Rm 42, 52, 62 and Vbe is the base emitter voltage drop of transistor Qsb 39 and transistor Q1b 44, Q2b 54, Qmb 64 in each current source. If the values of resistors R1 through Rm 42, 52, 62 are equal, then the LED current through each string 40, 50, 60 will be essentially equal. To minimize the power loss in the current setting resistors 42, 52, 62, zener diode D_ref 30 should preferably be selected with a low zener voltage.

R_limit 34 sets the current through zener D_ref 30 to a nominal level that is required to ensure that it is beyond the knee of the zener V-I curve, but not so high that it wastes power. Transistors Qsa 38 and Qsb 39 are biased by diode D_b 32 and zener diode D_ref 30 respectively and provide the base currents to the transistors Q#a 46, 56, 66 and Q#b 44, 54, 64 in each current source. If the voltage source V_DC 10 has a relatively high voltage and a large number of current sources are driven by Qsa 38 and Qsb 39, then one or more zener diodes, Ds_1 to Ds_i 36 can optionally be placed in series with Qsa 38 and Qsb 39 to take up some excess voltage and reduce the power dissipation in Qsa 38 and Qsb 39. Qsa 38 and Qsb 39 are used to provide the base currents for transistors Q#a 46, 56, 66 and Q#b 44, 54, 64 from the DC supply 10 directly in order to allow for greater design flexibility and more stable current control.

The inclusion of transistors Qsa 38 and Qsb 39 allows multiple current sources to be run from D_ref 30 without the reference voltage drooping. As the number of current sources increases, the total base current to transistors Q#a 46, 56, 66 and Q#b 44, 54, 64 increases, and if this were supplied only through R_limit 34, eventually not enough current would flow through D_ref 30 to maintain a stable voltage reference. This would result in the voltage dropping and hence the LED current to drop. Instead, base current can be supplied to multiple transistors Q#a 46, 56, 66 and Q#b 44, 54, 64 via the transistors Qsa 38 and Qsb 39.

If one or more of the LED strings 40, 50, 60 fails due to an open circuit (eg: LED failing open, faulty connection, etc.), the base currents in transistors Q#a 46, 56, 66 and Q#b 44, 54, 64 in the current sources in the open string would rise dramatically in order to maintain the current set by the base-emitter voltage and current setting resistors R#42, 52, 62. By allowing this increased current to be drawn through transistors Qsa 38 and Qsb 39, the current through zener diode 30 is not reduced and the voltage reference point is maintained, maintaining current through the other, working LED strings.

The lower transistors, Q#b 44, 54, 64, in each current source control the current according to the base voltage (set by D_ref 30 and the base-emitter voltage Vbe) and resistors R#42, 52, 62. If an upper transistor Q#a 46, 56, 66 were not present and the lower transistor Q#b 44, 54, 64 experienced significant heating, the base-emitter voltage of the lower transistor Q#b 44, 54, 64 would change and the current in the string 40, 50, 60 would change. Since transistors have a negative temperature coefficient, the current would increase with increasing temperature which would heat the transistor more, resulting in a condition of thermal runaway. The upper transistors, Q#a 46, 56, 66 in each current source, take up the excess voltage which is the difference between the voltage required by the LED string plus remainder of current source and the supplied voltage, V_DC 10. In this configuration, the transistor heating in the upper transistor Q#a 46, 56, 66 due to excess power dissipation will not affect the base-emitter voltage of the lower transistor Q#b 44, 54, 64 and hence the current set by current source will remain stable.

An alternate embodiment (not shown) of the drive topology shown in FIG. 3 may use a single current driver or current source I_DC in place of V_DC 10, and current mirrors in place of the individual current sources on each LED string to "reflect" the current through the first string onto the other strings, effectively splitting the current from the current source I_DC evenly between all the LED strings. These current mirrors could be of a type commonly known to one skilled in the art such as a Widlar or Wilson current mirror, or some modification thereof.

Second Embodiment

Digital Control

Figure 4:
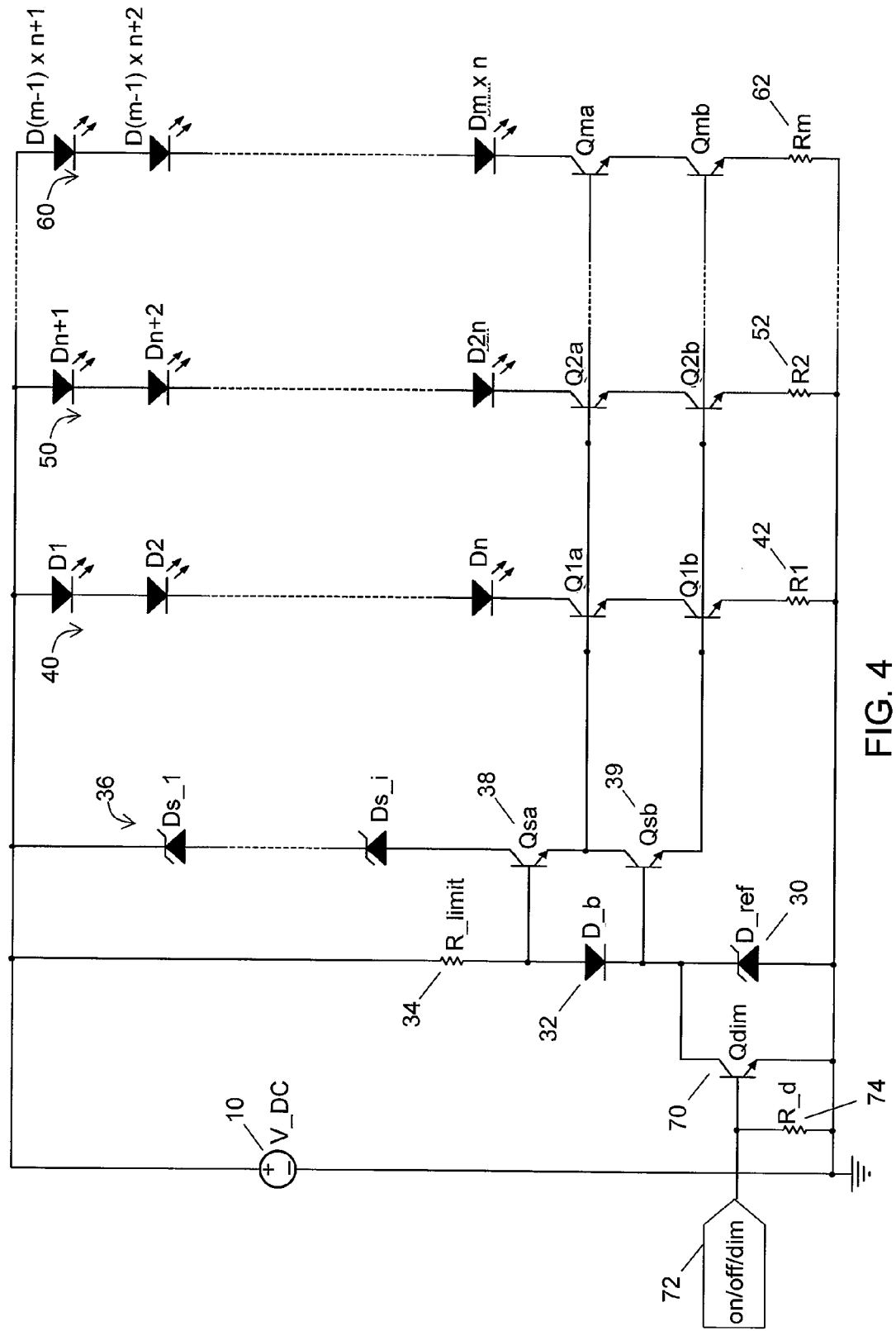
FIG. 4 is a schematic diagram illustrating a second exemplary embodiment of a light emitting element drive circuit with digital control in accordance with the present invention.

Referring now to FIG. 4, in a second exemplary embodiment of the light emitting element drive circuit of the present invention the current through all the LED strings 40, 50, 60 is controlled with a single digital control input 72. Transistor Qdim 70 is placed in parallel with zener diode D_ref 30, with a pull-down resistor 74 on its base where the digital control input 72 can be connected. As noted above, zener diode D_ref 30 establishes the biasing and voltage reference used by the current sources to set the current in the LED strings 40, 50, 60. By applying a positive voltage signal to the base of transistor Qdim 70 sufficient to turn it on and short zener D_ref 30 to ground, the reference voltage will be set to approximately 0V which will reduce the current through the LED strings 40, 50, 60 to approximately 0 mA, turning them off.

In a similar fashion, by pulsing the voltage signal to the base of transistor Qdim 70 the LEDs of strings 40, 50, 60 will turn on and off in response. So any well known digital dimming technique such as pulse width modulation, pulse code modulation, etc., can be used to provide continuous dimming of the average current through the LEDs from 0 to 100% of the current set by resistors R1 through Rm 42, 52, 62.

More generally, any switching device, transistor, relay, etc, (not shown) placed elsewhere in the circuit branch containing zener diode D_ref 30, or placed between the emitter(s) of transistors Qsa 38 and/or Qsb 39 and the bases of the current source transistors Q#a and/or Q#b, could provide the same type of on/off/dimming control.

Third Embodiment

Analog Control

Figure 5:
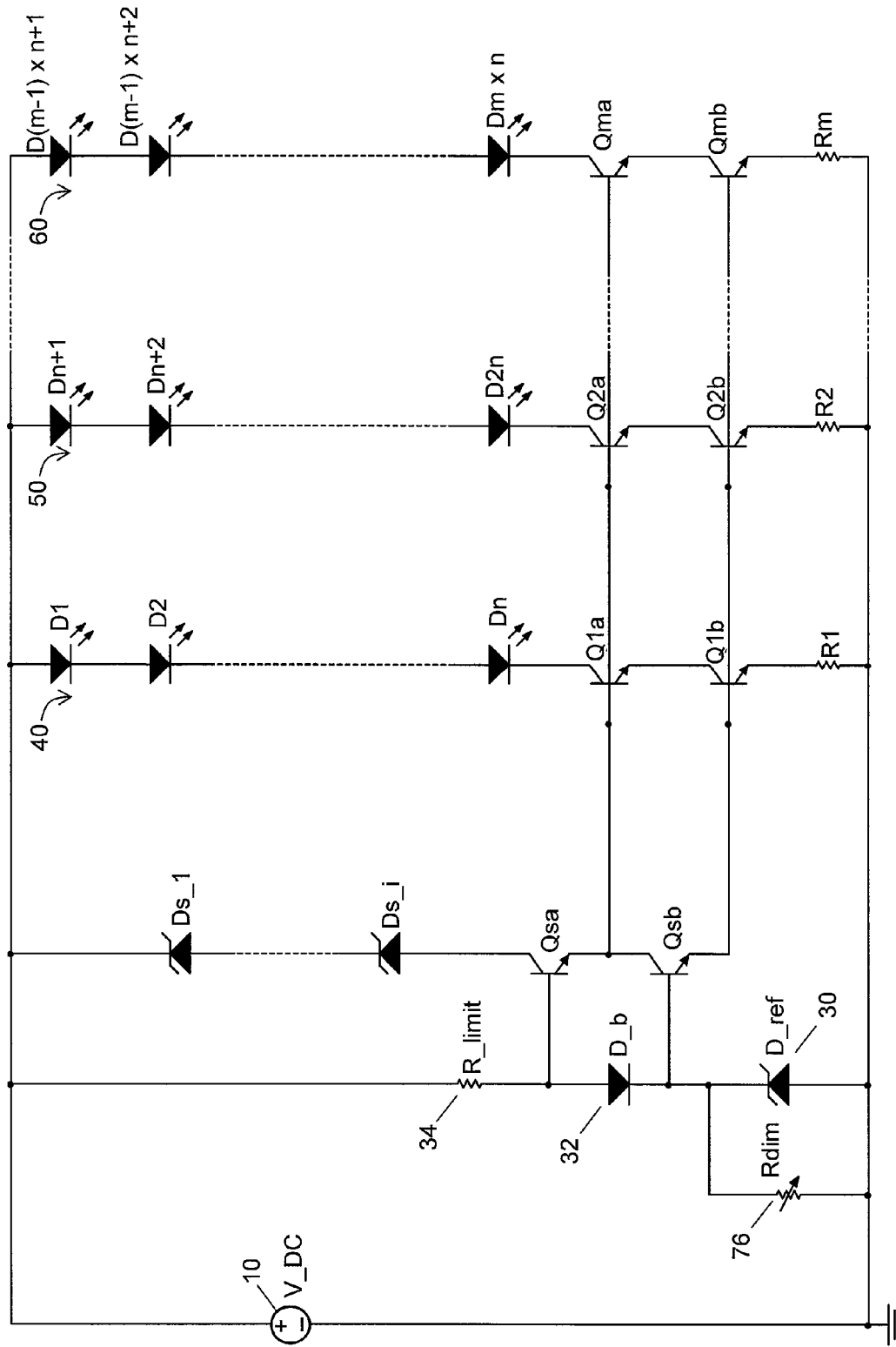
FIG. 5 is a schematic diagram illustrating a third exemplary embodiment of a light emitting element drive circuit with analog control in accordance with the present invention.

Referring to FIG. 5, in a third exemplary embodiment of the light emitting element drive circuit of the present invention an analog control option is provided that uses a variable resistor 76 or variable resistance element such as a transistor controlled in its linear region in parallel with zener diode D_ref 30, instead of a switching element. By reducing the resistance of Rdim 76, the amount of current flowing through zener diode D_ref 30 can be reduced which will reduce the voltage reference and hence the level of current flowing through the LED strings 40, 50, 60. Since the V-I characteristic of the zener diode D_ref 30 is non-linear, using a linear dimming element such as a standard potentiometer will not result in linear dimming of the LED current. Therefore, to improve the ability to make fine and more predictable adjustment of the analog LED current level, it may be preferable to use a logarithmic potentiometer or similar non-linear dimming element or circuit. Similar to the digital dimming circuit of FIG. 4, an analog dimming element such as a variable resistor, etc. could be placed elsewhere in the circuit to create a similar analog dimming effect. For example, placing it in series (not shown) with R_limit 34 and increasing the resistance from zero to some high resistance level would decrease the current through zener diode D_ref 30 and cause the LED current to decrease.

Fourth Embodiment

Fewer Strings

Figure 6:
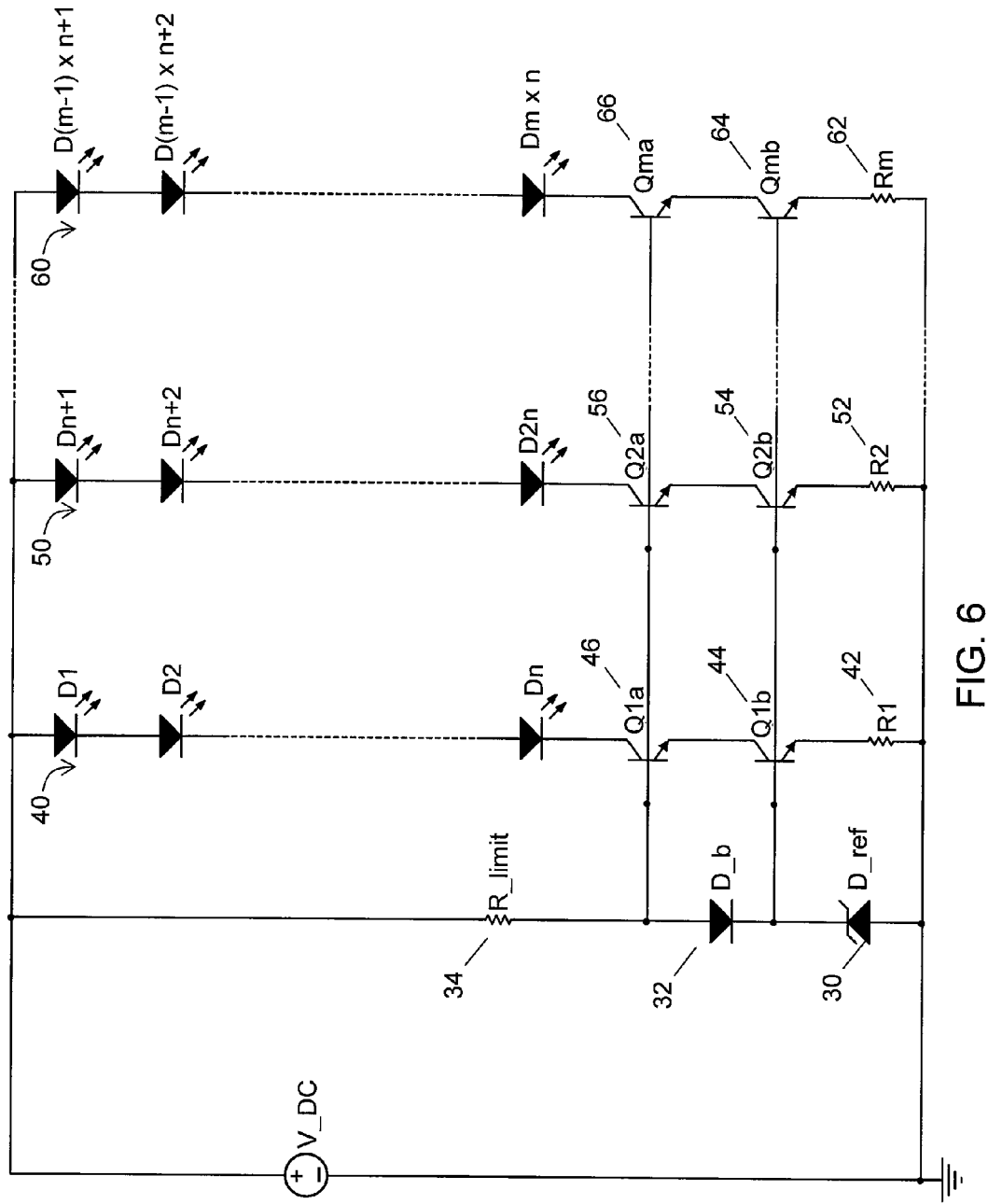
FIG. 6 is a schematic diagram illustrating a fourth exemplary embodiment of a simplified light emitting element drive circuit in accordance with the present invention.

Referring to FIG. 6, in a fourth exemplary embodiment of the light emitting element drive circuit of the present invention transistors Qsa 38 and Qsb 39 have been removed from the circuits described above. This circuit has application for a limited number of current sources run from the reference voltage provided by zener diode D_ref 30.

As the number of current sources increases, the total base current to the transistors Q#a 46, 56, 66 and Q#b 44, 54, 64 increases, but as this current is supplied through R_limit 34, eventually an insufficient amount of current flows through zener diode D_ref 30 to maintain a stable voltage reference, resulting in the reference voltage to drop and hence the LED current to drop.

This problem would be magnified if one or more of the LED strings 40, 50, 60 were to fail due to an open circuit (eg: LED failing open, faulty connection, etc.). In this case the base current for the transistors Q#a 46, 56, 66 and transistors Q#b 44, 54, 64 in the current source in the open string would rise dramatically in order to maintain the current set by the Q#b 44, 54, 64 base emitter voltage and current setting resistor 42, 52, 62 by drawing the current through the base. The result is the same as above with the zener voltage dropping and the LED current through all the strings dropping. This embodiment is therefore suited to use with fewer LED strings 40, 50, 60.

Fifth Embodiment

AC/DC Converter

V_DC 10 may be provided by a standard type of AC/DC power supply with a typical efficiency of ~80-85%. This would have the advantage of having good line and load regulation, being "universal", with an input to run off different AC mains supplies (eg: 100 VAC, 120 VAC, 230 VAC, etc), an output voltage suited to match the optimal V_DC 10 requirements determined by the length of the LED strings 40, 50, 60 as well as having good power factor and EMC compliance. However, a lower cost and greater efficiency can be obtained as described below.

Figure 7:
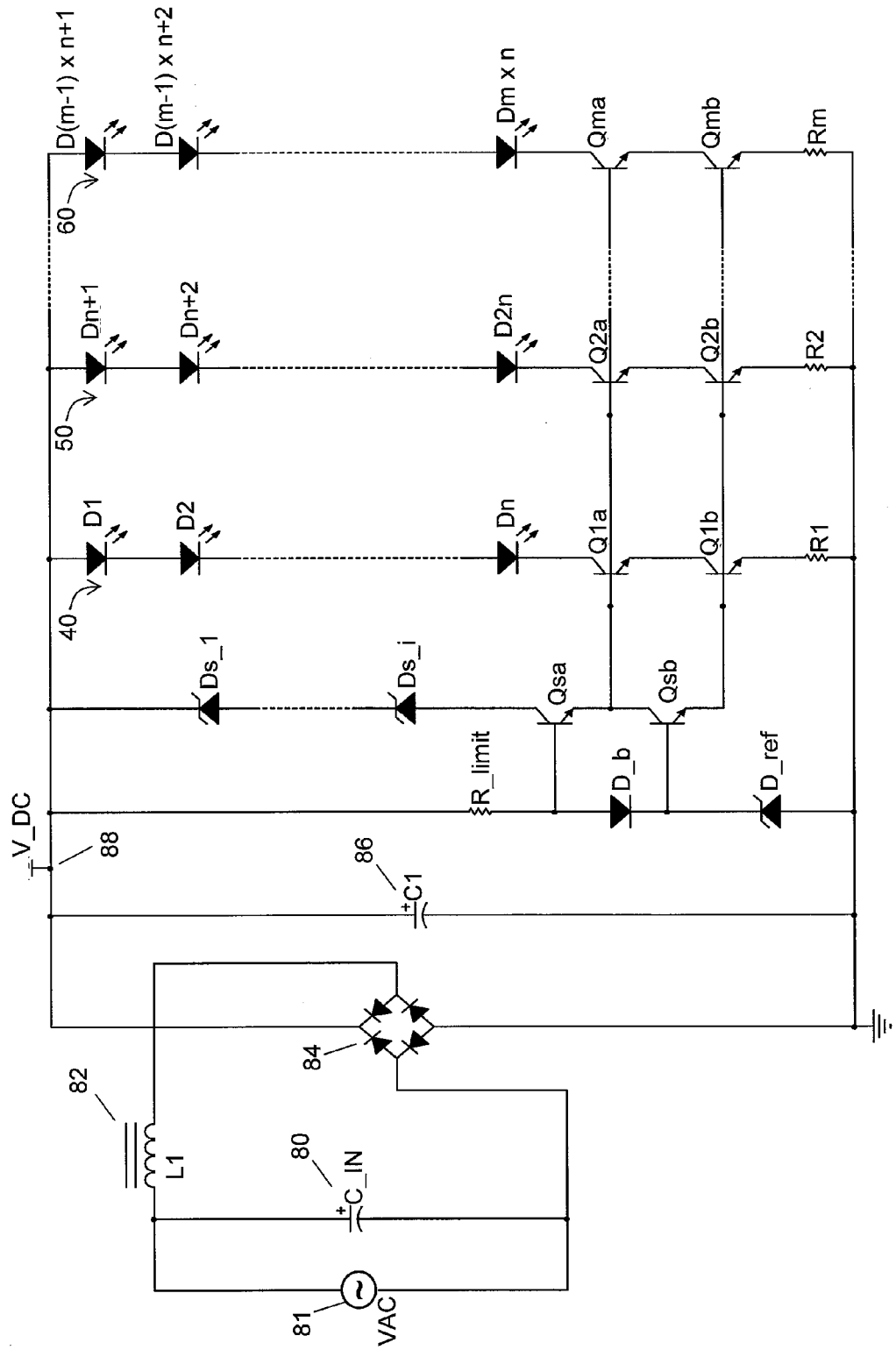
FIG. 7 is a schematic diagram illustrating a fifth exemplary embodiment of a light emitting element drive circuit with AC to DC conversion in accordance with the present invention.

Referring now to FIG. 7, in a fifth exemplary embodiment of the light emitting element drive circuit of the present invention a simplified AC/DC conversion stage is used to provide V_DC 88 to the array and drive circuitry. The AC/DC conversion stage includes an input filter C_IN 80 and inductor L1 82 which may be an iron core type. This input filter provides a level of power factor correction which may be necessary if the total power draw of the system exceeds a certain level, say about 25 watts. If the system power is less than approximately 200 watts this passive form of Power Factor Correction (PFC) can be less expensive than a more complicated, active PFC solution. The input filter C_IN 80 and inductor L1 82 are followed by a diode bridge rectifier 84 and smoothing capacitor C1 86 to provide essentially DC voltage 88 with minimal ripple to the rest of the circuit.

This simplified AC input stage is less expensive and can be more efficient than a full universal input AC/DC power supply with active power factor correction and step up/step down stages used to provide a specific output voltage. For a known AC input voltage 81, V_DC 88 can be calculated and the LED array configuration designed to suit it, including allowances for common AC mains variation. For example, in one embodiment, if the AC mains 81 is 120 VAC, then V_DC 88 will be approximately 170V. If Vf_max of the LEDs is 3.6V, then the maximum length of a LED string 40, 50, 60 is approximately 47 LEDs. The actual maximum string voltage will be statistically less than 47×3.6V, allowing longer string lengths, but with AC mains variation of up to +/−15% V_DC 88 may drop to approximately 145V, so string lengths longer than 47 LEDs may be less effective. Regardless, this general approach can be used to design an optimized system as before as long as the input mains voltage 81 and variation is accounted for, and the resulting system will be less expensive and at least as efficient as with a standard AC/DC power supply. Furthermore, if the number of LEDs is reduced and/or the LED current is low enough so that the system power is less than approximately 25 W, then the input power factor correction filter could be eliminated saving even more cost.

Sixth Embodiment

Bypass Elements

Figure 8:
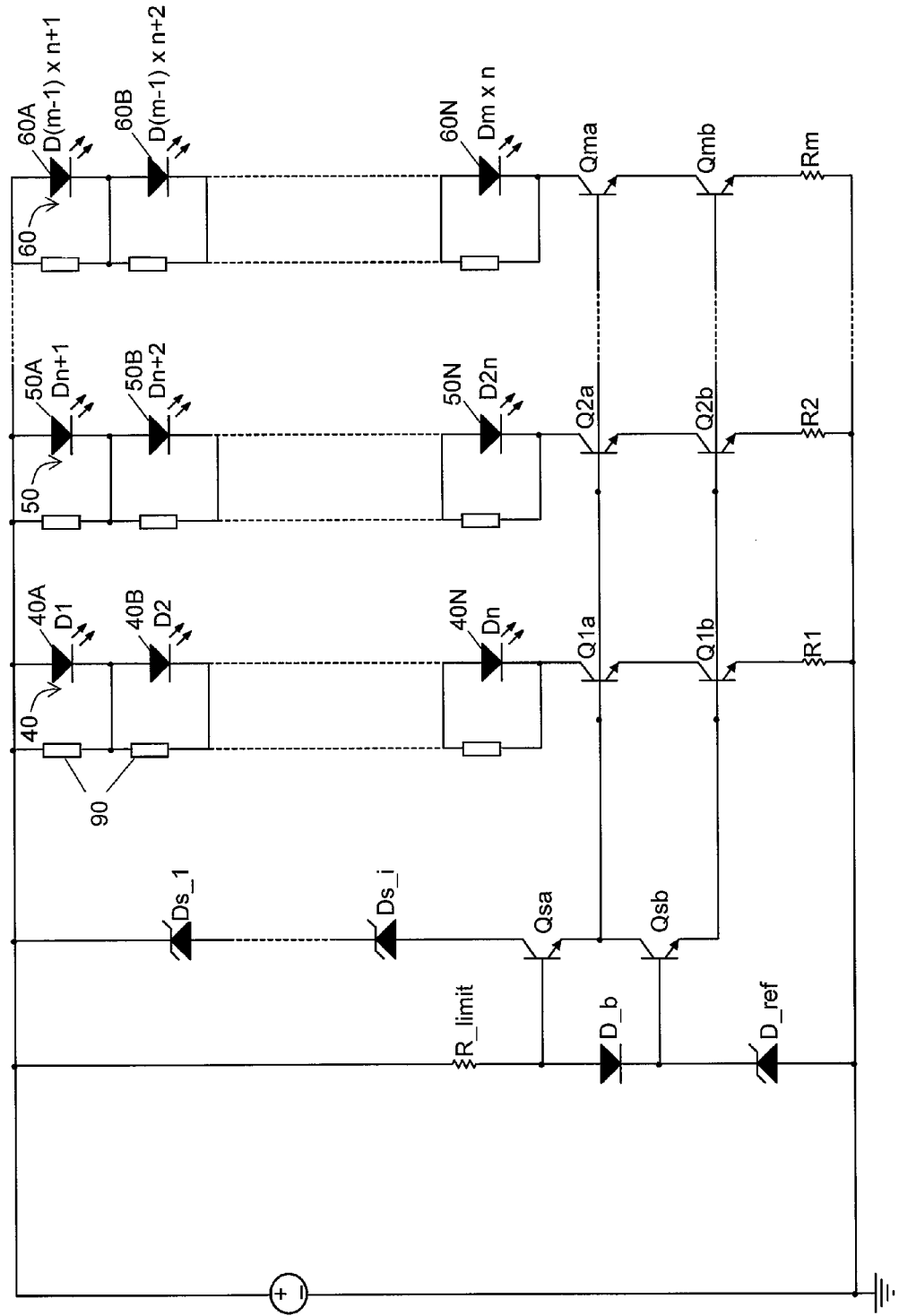
FIG. 8 is a schematic diagram illustrating a sixth exemplary embodiment of a light emitting element drive circuit with passive bypass elements in accordance with the present invention.

Referring to FIG. 8, in a sixth exemplary embodiment, the light emitting element drive circuit of the present invention includes bypass elements 90 in parallel with each LED 40A, 40B, 40N in LED string 40 and in parallel with LEDs 50A, 50B, 50N, 60A, 60B, 60N in other strings 50, 60. These may be passive devices, for example zener diodes, or anti-fuses, which normally are high impedance and allow little or no current to flow through them, but which become low impedance and provide an alternate current path around the LED if it should fail as an open circuit. In this way, if any LED or LEDs in a string fails open circuit, the whole string will not go out, but rather all the remaining good LEDs will stay illuminated.

As an alternative to using non-illuminating bypass elements such as zener diodes or antifuses, an additional LED or LEDs could be added in parallel with every LED. In this way, they would split the current between them according to their forward voltages which potentially could be different, and the parallel cluster of LEDs would be illuminated but at a lower intensity and lower LED current. Then if one LED failed as an open circuit, the other(s) would remain illuminated but now would take the full string current and still allow the entire string to remain illuminated.

Another alternate embodiment would be to use active bypass elements such as transistors, relays, or other switching devices in parallel with each LED to provide a bypass path for the LED current if one or more LEDs 40A, 40B in a string 40, 50, 60 fails as an open circuit.

Seventh Embodiment

Phase Shift Elements

Figure 9:
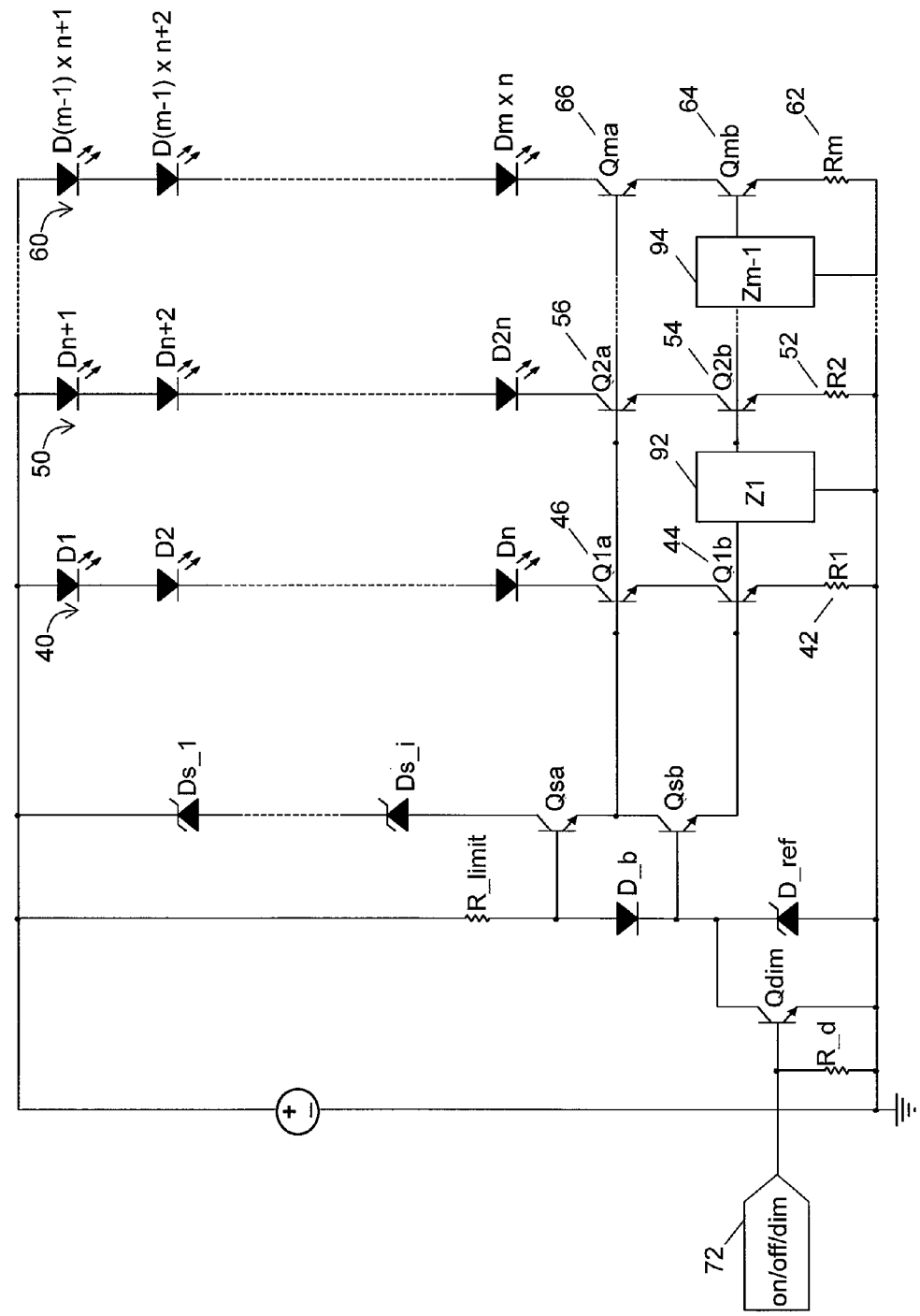
FIG. 9 is a schematic diagram illustrating a seventh exemplary embodiment of a light emitting element drive circuit with digital control and phase-shift elements in accordance with the present invention.

Referring now to FIG. 9, there is shown a seventh exemplary embodiment of the light emitting element drive circuit. This circuit of FIG. 9 may be best be understood in comparison with the second embodiment shown in FIG. 4, which allows for digital dimming of all the LEDs in the LED system with a single digital control input 72. In the circuit in FIG. 4, if all the LEDs turn on and off simultaneously, the current supplied by the power supply may experience large step changes, which may cause problems for some types of power supply, as well as increased electromagnetic interference due to large current pulses on the lines between the power supply and the LED drive system. In FIG. 9, phase shift elements Z1 through Zm-1 92, 94 are included between the bases of current control transistors Q#b 44, 54, 64 and which can act to delay the response of the downstream transistor to a change in the reference voltage set by control 72. In this way, during digital dimming, the LED strings 40, 50, 60 are not turned off simultaneously, but are turned off in a phase shifted time sequence, thus smoothing out the average current drawn from the power supply, while still producing the desired dimming effect of the entire array. The phase shift elements could be a low pass RC filter appropriately tuned to the frequency of the digital dimming signal, or other type of delay element as may be known by one skilled in the art.

Eighth Embodiment

Improved Efficacy Circuit

As discussed above, a "buffer voltage" can be built into the system to allow for different string voltages arising from normal LED forward voltage variations due to manufacturing yields, temperature, etc. This buffer voltage can also be specified to allow for activation of a given number of bypass elements which may need to have a higher voltage than the LEDs. In any case, if the LEDs in a string or combination of LEDs and bypass elements produce a string voltage which exceeds the total available provided by the source, then the current through the string will drop below the programmed set point. In this case the current sources in the previously described embodiments will attempt to compensate for the reduction in string current by drawing more base current through the transistors 46, 56, 66 (FIG. 3). The same effect occurs if a connection fails anywhere in the string or at the transistor collector preventing current from flowing into transistors 46, 56, 66—base current flowing into the transistors will increase to a level to ensure the programmed current continues to flow through resistors 42, 52, 62. The overall effect of these failure modes is that the light output from the array of LEDs will drop, but the total current and hence electrical power consumed will not decrease, thereby causing the system efficacy to drop.

Figure 10:
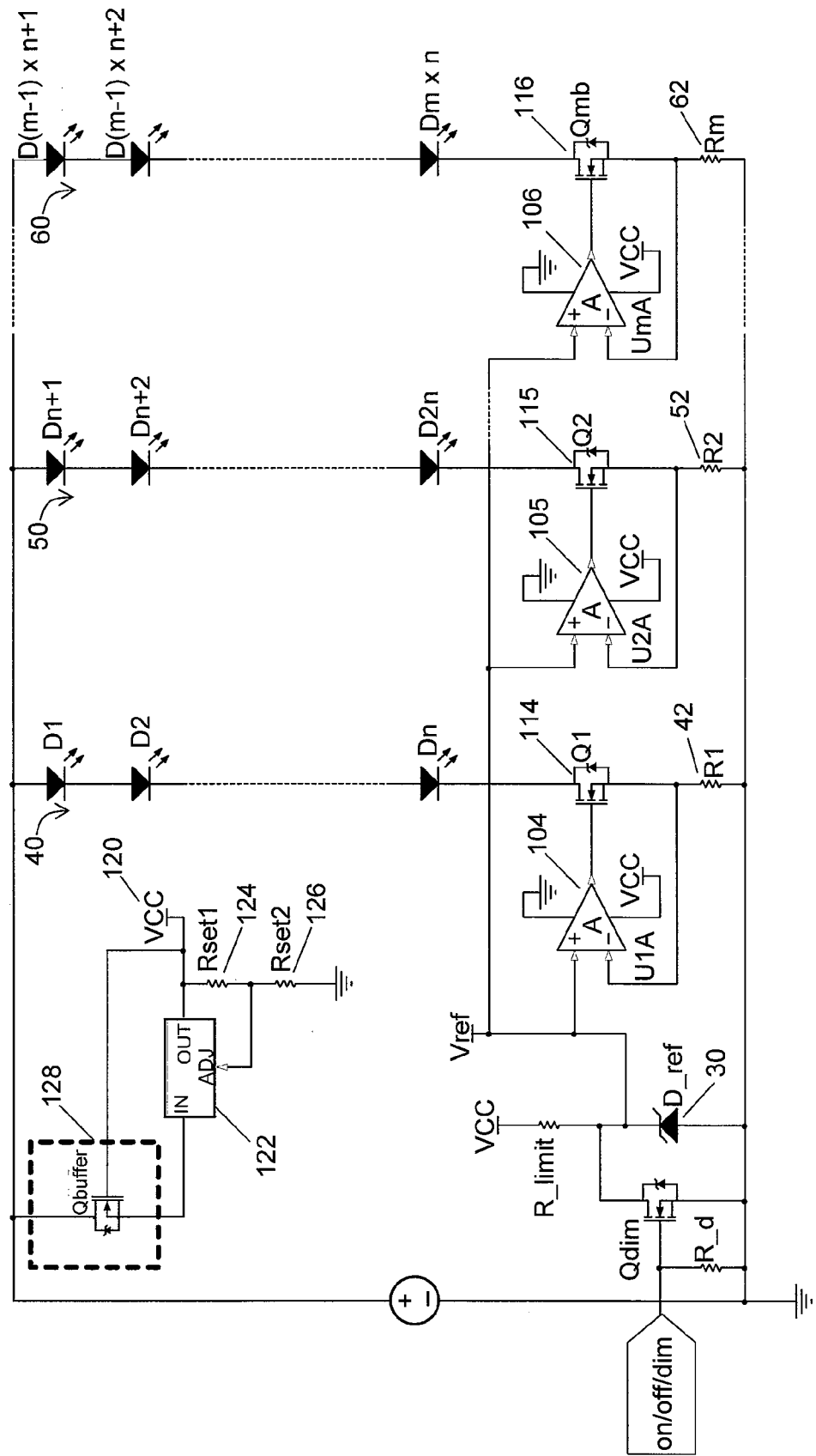
FIG. 10 is a schematic diagram illustrating an eighth exemplary embodiment of a light emitting element drive circuit with FETs in accordance with the present invention.

Referring now to FIG. 10, there is shown an eighth exemplary embodiment of the light emitting element drive circuit of the present invention which prevents this drop in efficacy in the case of LED failures or other types of string connection failures. The current sources in this embodiment each use an op amp U1A through UmA 104, 105, 106 to control the gate voltage of a field effect transistor (FET) Q1 through Qm 114, 115, 116 so that the voltage across the current setting resistors R1 through Rm 42, 52, 62 matches the reference voltage set by D_ref 30. But since FETs are voltage controlled, unlike bipolar junction transistors (BJTs), even if the current through the LEDs drops due to not enough source voltage, or a connection failure, the current source will not draw any more current than under normal conditions. So a drop in current through any of the LED strings will manifest itself as a drop in total current used by the system. Thus, even though there will still be an associated drop in light output, the total system power will drop proportionally and thus keep the system efficacy about the same.

Another benefit of this embodiment is that it is not susceptible to the current set point drifting if the transistors heat up since the op amps 104, 105, 106 will continuously monitor and regulate the current regardless of the transistor characteristics. Thus the excess voltage can be taken up by the FETs 114, 115, 116 themselves without additional transistors or other components.

Furthermore, since the current drawn by the inputs of the op amps 104, 105, 106 is so low, there is no risk that having dozens, or even hundreds of current sources will draw significant current away from the reference zener D_ref 30 which would result in the reference voltage dropping as previously mentioned. But the methods of analog or digital dimming described previously will still work with this embodiment since they will change the reference voltage Vref which the op amps 104, 105, 106 are using to control the current through the LEDs D1 through Dmxn 40, 50, 60. In the case of digital dimming, if the pulse frequency is quite high, for example greater than 1 kHz, it may be necessary to specify op amps with a high slew rate to be able to switch the FETs on and off fast enough and make it possible to achieve very high or very low duty cycles.

This embodiment requires a voltage regulator which was not required for the other embodiments. This regulator is needed to provide a relatively low voltage VCC 120, on the order of about 15V, to power the op amps. To minimize cost and part count, this voltage regulator may be a 3 terminal linear regulator 122 as shown and connected to resistors Rset1 124 and Rset2 126. To maximize efficiency and reduce the power dissipation in the regulator, especially if the supply voltage V_DC required for the LED array exceeds, for example, 50V, op amps may be selected with a very low quiescent current and supply current since the total power dissipated in the regulator 122 will be the total current for the op amps multiplied by the voltage difference between the supply voltage V_DC and the regulator output voltage VCC. Alternatively, a more expensive switching regulator or dc/dc converter can be used in place of the linear voltage regulator to provide the power for the op amps as would be understood by one skilled in the art. This would improve the overall system efficiency but increase the system cost. Another method to reduce the power dissipated in the voltage regulator is to include another component in series between the high voltage input and the voltage regulator to drop some of the voltage, for example a resistor or zener diode (not shown), or a depletion mode MOSFET, Qbuffer 128, connected as shown in FIG. 10. The total power loss and hence system efficiency would remain the same, but this makes it possible to use a smaller and lower cost voltage regulator which does not need to be able to handle a large input to output voltage differential.

Since VCC is not a critical parameter and only a small current is drawn from this low voltage supply, other methods of generating this voltage from the input supply voltage include the use of a zener diode and resistor directly between the input supply voltage and ground (not shown), or using a zener and resistor plus transistor in emitter-follower configuration (not shown), as is known by those skilled in the art. These will give a less precise voltage but can be adequate for the proper operation of the op amps, and can save cost and/or reduce parts count compared to an integrated circuit type of 3-terminal regulator.

Figure 11:
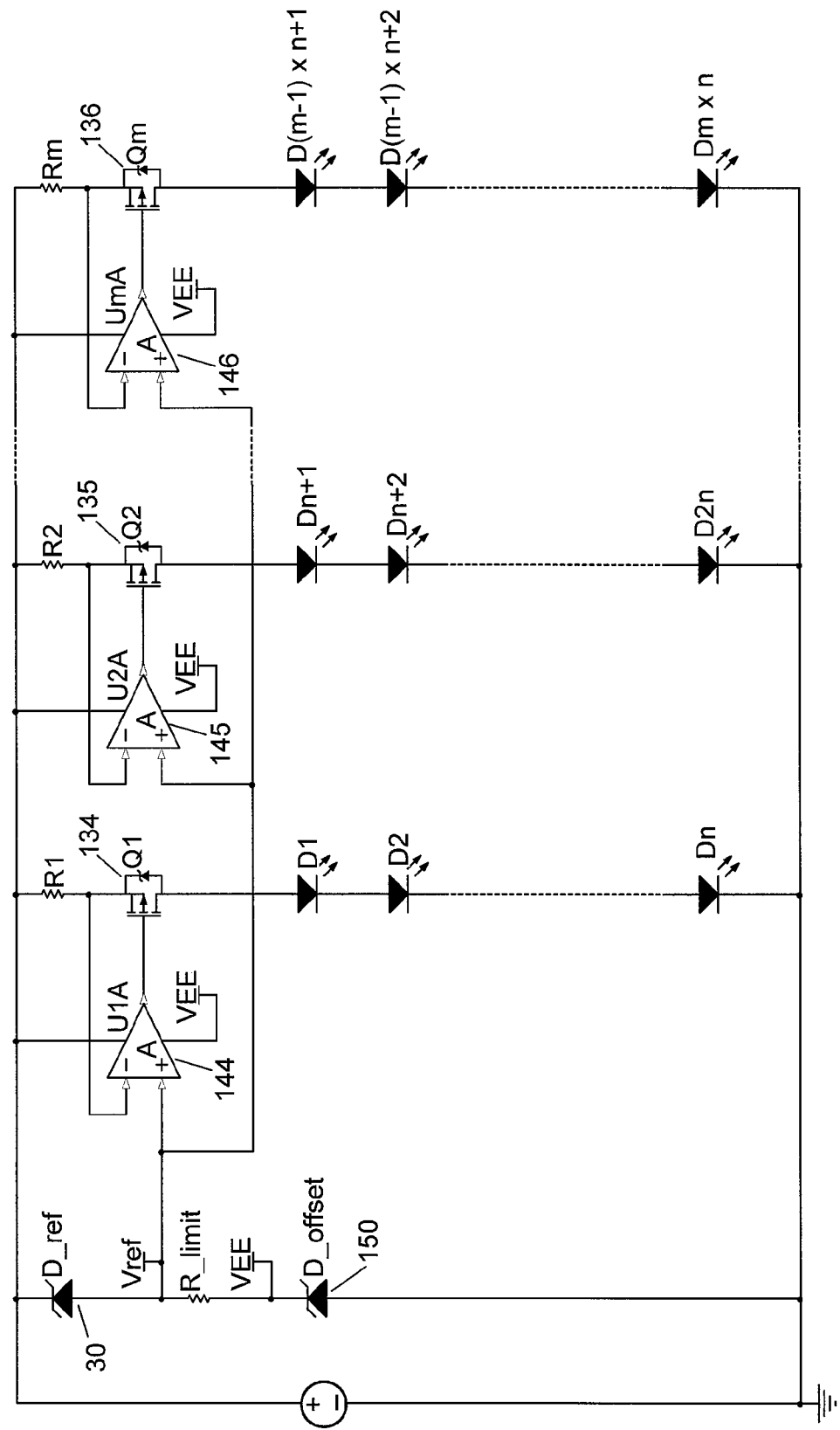
FIG. 11 is a schematic diagram illustrating another light emitting element drive circuit with FETs.

FIG. 11 shows another embodiment of the light emitting element drive circuit which functions similar to the embodiment in FIG. 10, except the circuit in FIG. 11 uses P-channel FETs 134, 135, 136. Another difference is that the op amps 144, 145, 146 are powered directly from the supply voltage V_DC, and the reference voltage Vref which is still set by using a zener D_ref 30 is set with respect to the supply voltage as well. In order to do this, a second zener D_offset 150 is used to create an artificial "ground" level VEE which serves as the negative supply voltage for the op amps. D_offset 150 is chosen so that VEE will be set to a potential which is suitable for the op amp based on its differential input voltage requirements, for example about 15V below V_DC. Analog or digital dimming of the LEDs is still possible by adjusting the current through the reference zener using a potentiometer in series with D_ref, or shunting current around it by means of transistors (not shown), in a similar fashion as depicted previously.

Figure 12:
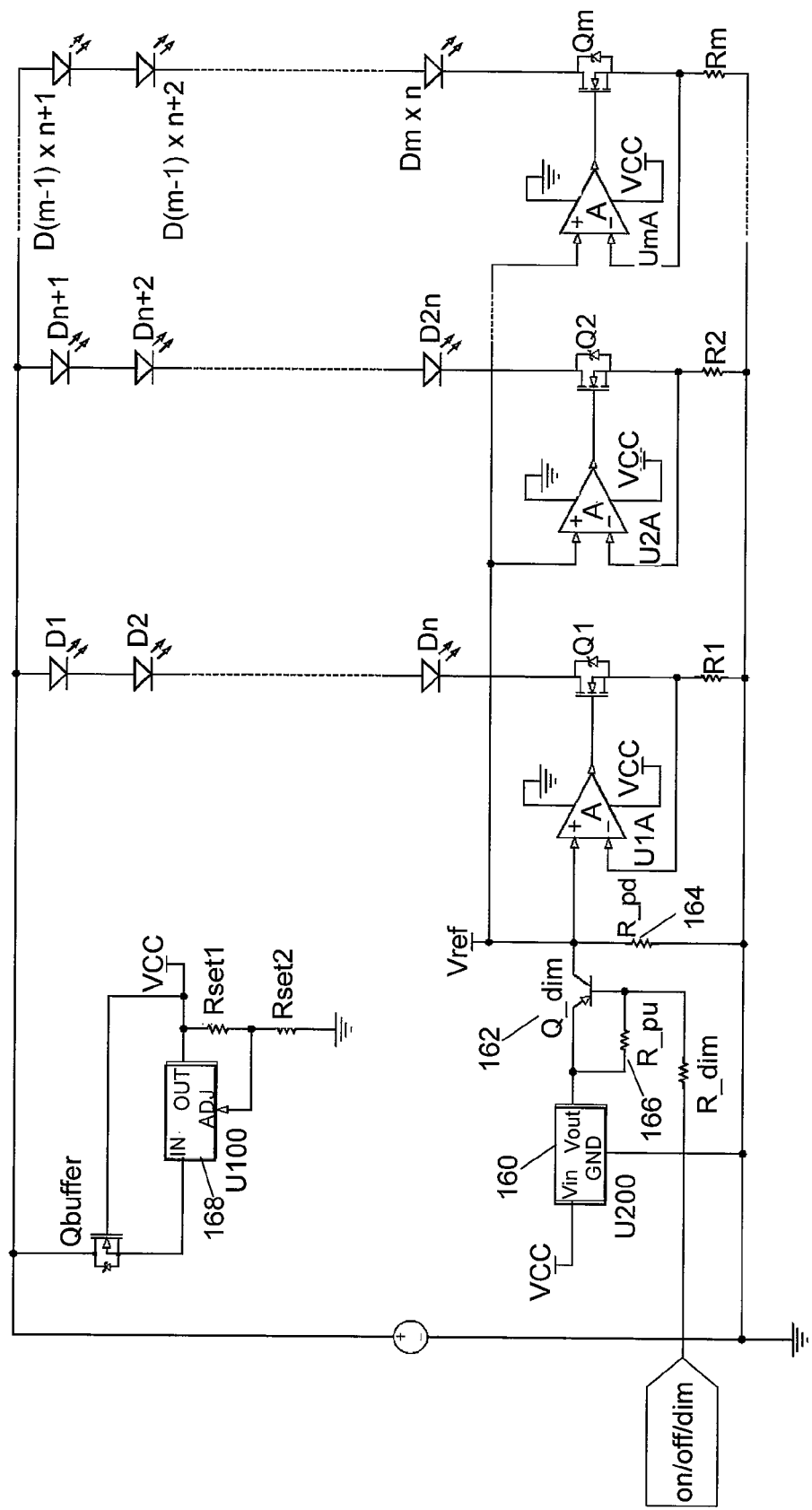
FIG. 12 is a schematic diagram illustrating still another light emitting element drive circuit with a voltage reference.

FIG. 12 shows still another embodiment of the light emitting element drive circuit which functions similar to the embodiment in FIG. 10, except the circuit in FIG. 12 uses a dedicated voltage reference IC U200 in place of the zener diode. The advantage of this is it can generate a more precise reference voltage for the op amps and draw less current and hence dissipate less power than a zener diode. Furthermore the output voltage of a voltage reference IC can be more stable and is not susceptible to drooping if more op amps are connected up until a certain current limit is reached—typically tens of milliamps. Due to this difference, a slightly different arrangement is required to dim since using a transistor to short Vref would not produce the same effect as shorting across the zener diode in the previous embodiments. Transistor Qdim is therefore placed in series with the output of U200. Applying a digital 'hi' or 'low' signal to the base of Qdim to operate it like a switch allows digital dimming of all the strings simultaneously as with previous embodiments. When the base of Qdim is pulled low, Vref is approximately equal to the output of the voltage reference, causing the LEDs to turn on and when the base of Qdim is pulled high, Vref is pulled down to ground by R_pd which will turn the LEDs off. Applying an intermediate voltage to the base of Qdim operates it in the linear region which would allow analog dimming of the LEDs. R_pu ensures that if the dimming input signal is in some indeterminate state, for example during initial system power up, Qdim is forced to remain off. As would be understood by one skilled in the art, if only digital dimming is desired, Qdim could alternately be placed between Vcc and Vin of U200 since the turn on and turn off characteristics of voltage reference ICs can accommodate fast transitions which would be expected during digital dimming. However, analog dimming would not be effective in that arrangement since supplying an intermediate voltage to the input of U200 would not produce a stable output for Vref.

Figure 13:
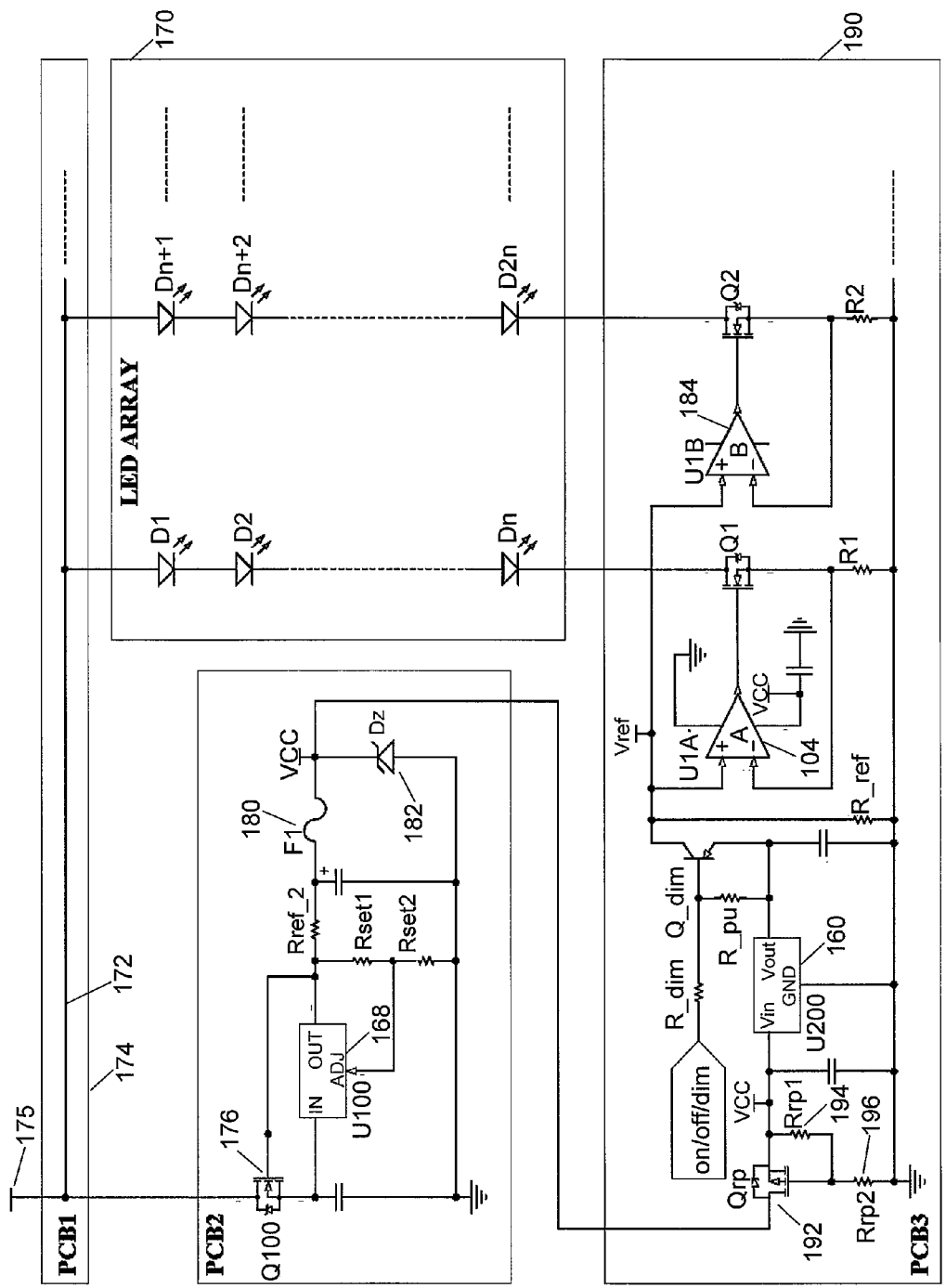
FIG. 13 is a schematic diagram illustrating an implementation of the light emitting element drive circuit of FIG. 12 in a modular system with multiple circuit boards.

FIG. 13 illustrates a method of implementing the embodiment described in FIG. 12 in a modular system with multiple circuit boards. The LEDs are mounted on one (or more) circuit boards 170 to form an array. The anode of the first LED in each string in the array is electrically connected to the high voltage bus 172 which may be on a separate circuit board, PCB1 174 and connected to a high voltage supply 175. The high voltage bus is also electrically connected to the depletion mosfet Q100 176 which in turn is connected to voltage regulator U100 168 may be mounted on a separate circuit board PCB2 178, along with various protection elements such as a fuse F1 180 and zener diode Dz 182 to prevent the output VCC from exceeding certain safe limits. VCC is electrically connected to the voltage reference IC U200 and op amps U1A 104, U1B 184, etc., which form the basis for the current sources which may all be mounted on a separate circuit board PCB3 190. The current sources are each electrically connected to the cathode of the last LED in each string in the array. Reverse protection circuitry, Qrp 192, Rrp1 194, Rrp2 196 may be included on PCB3 190 to guard against damage which could occur by misconnecting VCC and ground. This multiple circuit board configuration can allow for easier system assembly and increased design flexibility of mechanical mounting and/or electrical connections of the system components and modules.

Figure 14:
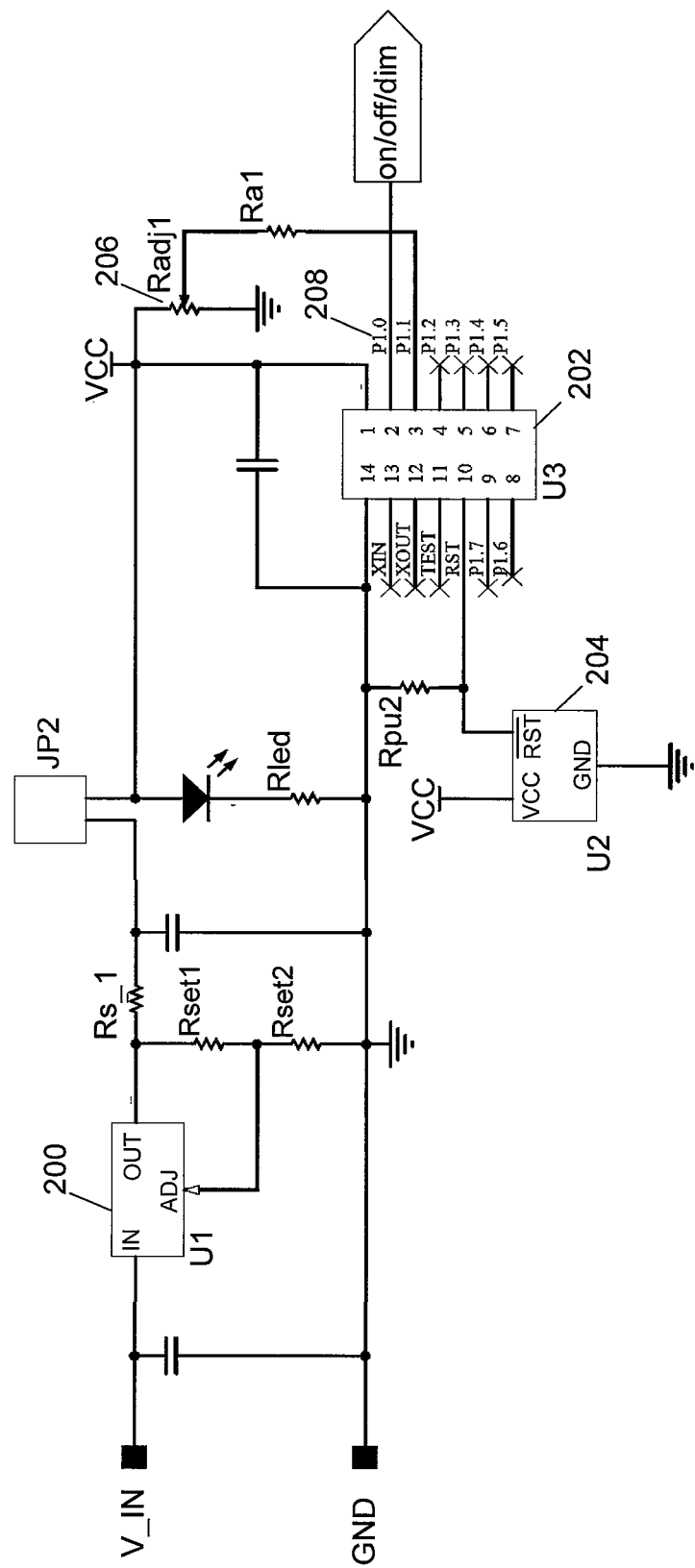
FIG. 14 is a schematic diagram illustrating an exemplary embodiment of a digital dimming circuit that can be added to the modular system of FIG. 13.

FIG. 14 illustrates an embodiment of a dimming circuit which can be added to the modular system of FIG. 13 described above. It comprises a voltage regulator U1 which may be supplied power from VCC. It generates a lower DC voltage appropriate for powering microcontroller IC U3 and reset IC U2. Potentiometer Radj1 is connected to an analog to digital converter input on microcontroller U3. When the potentiometer is adjusted, the microcontroller reads the change in analog voltage and generates an associated dimming signal on one of its digital outputs (P1.0) which turns Qdim on and off as defined by the particular algorithm and digital dimming method being used, such as pulse width modulation, pulse code modulation, etc. In one embodiment an algorithm is employed which generates a PWM signal with a fixed turn off time and a variable on time adjusted by the analog signal from the potentiometer. In this way both the duty cycle and frequency of the dimming signal is adjusted simultaneously. This control technique has the advantage of being easy to implement in firmware minimizing the computational overhead and also allows for a simpler microcontroller to be used rather than a one which has dedicated pulse width modulation hardware integrated into it. An alternate algorithm which generates a PWM signal with a fixed turn on time and variable off time could also be employed.

Figure 15:
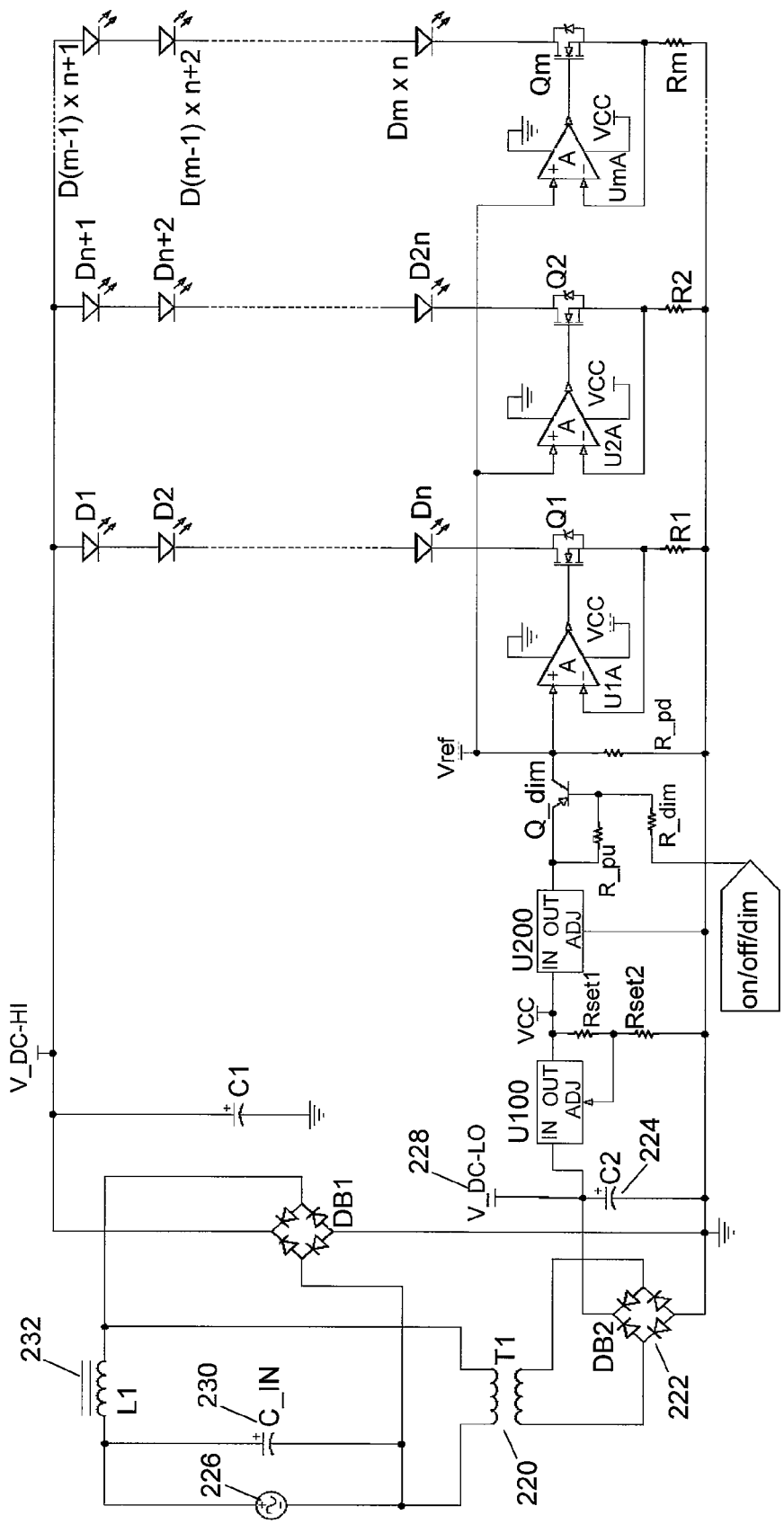
FIG. 15 is a schematic diagram illustrating an exemplary embodiment of a light emitting element drive circuit similar to that of FIG. 7 but with a low voltage transformer.

FIG. 15 illustrates an embodiment of the light emitting element drive circuit which is similar to FIG. 7, but which uses a transformer T1 220 and Diode Bridge 2 222 with smoothing capacitor C2 224 to convert the input AC power 226 to a low DC voltage V_DC-LO 228 suitable for the voltage reference and op amps making up the current sources of the drive circuitry. This has the advantage of more efficiently generating the low voltage from the AC supply voltage, and eliminating the depletion mode MOSFET discussed in previous embodiments, as well as providing a measure of safety through inductive isolation. Since only a few milliamps of current are required, the size and cost of transformer T1 220 and diode bridge 222 can be minimized, and may be lower than a switching DC/DC converter circuit which has a higher component count as well as input voltage limitations. Additionally, even though the low power draw of this portion of the system should not significantly impact the overall power factor the transformer T1 is connected after the passive PFC filter comprised of C_IN 230 and L1 232. However, depending on the level of power factor desired, the transformer T1 could alternately be connected directly to the AC input instead (not shown).

Variations

In the description herein, embodiments disclosing specific details have been set forth in order to provide a thorough understanding of the invention, and not to provide limitation. However, it will be clear to one having skill in the art that other embodiments according to the present teachings are possible that are within the scope of the invention disclosed.

All parameters, dimensions, materials, and configurations described herein are examples only and actual values of such depend on the specific embodiment.

What is claimed is:

1. A method for driving light emitting elements, comprising the steps of:
providing a voltage reference to a plurality of parallel-connected current sources;
driving current from each current source through a respective one of a plurality of strings of light emitting elements wherein each current source is connected in series with one of the strings of light emitting elements;
taking up excess voltage not required by any one of the strings of light emitting elements; and
determining the supply voltage for the one or more strings of LEDs by multiplying standard deviations of forward voltages of the LEDs by square root of maximum number of LEDs per string to yield an adjusted standard deviation and then setting the supply voltage equal to the sum of average forward voltage of the LEDs and a multiple of the adjusted standard deviation of the forward voltage.

2. The method of claim 1 further comprising controlling in an analog manner the voltage reference provided to the current sources for controlling on, off and dimming of the light emitting elements in the strings thereof.

3. The method of claim 1 further comprising controlling in a digital manner the voltage reference provided to the current sources for controlling on, off and dimming of the light emitting elements in the strings thereof.

4. A method for driving light emitting elements, the method comprising:
providing a voltage reference to a plurality of parallel-connected current sources;
driving current from each current source through a respective one of a plurality of strings of light emitting elements wherein each current source is connected in series with one of the strings of light emitting elements;
taking up excess voltage not required by any one of the strings of light emitting elements; and
controlling in a digital manner the voltage reference provided to the current sources for controlling on, off and dimming of the light emitting elements in the strings thereof,
wherein said controlling includes producing a delay, in the form of a phase shifted time sequence, of the response of the current sources to the provision of the voltage reference in the digital manner.

5. The method of claim 1 wherein said providing the voltage reference includes converting a source of voltage supply from AC to DC voltage.

6. The method of claim 1 further comprising bypassing current relative to at least one of the light emitting elements in each of the strings in response to occurrence of an open circuit failure at the at least one of the light emitting elements.

7. The method of claim 1 further comprising providing the strings of light emitting elements on separate circuit boards so as to produce modular configurations thereof.

8. The method of claim 7 further comprising providing a microcontroller for controlling on, off and dimming of the light emitting elements in the strings thereof on the separate circuit boards.

9. The method of claim 4 further comprising determining the supply voltage for the one or more strings of LEDs by multiplying standard deviations of forward voltages of the LEDs by square root of maximum number of LEDs per string to yield an adjusted standard deviation and then setting the supply voltage equal to the sum of average forward voltage of the LEDs and a multiple of the adjusted standard deviation of the forward voltage.

10. A system for driving light emitting elements, comprising:
a plurality of strings of light emitting elements;
a plurality of current sources connected in parallel with each other, each of said current sources for providing current to one of said strings of light emitting elements;
a voltage reference connected to said plurality of parallel-connected current sources for driving current from each of said current sources through a respective one of said strings of light emitting elements; and
a plurality of excess voltage take-up elements each connected in series between one of said current sources and one of said strings of light emitting elements,
wherein supply voltage for the one or more strings of LEDs is determined by multiplying standard deviations of forward voltages of the LEDs by square root of the maximum number of LEDs per string to yield an adjusted standard deviation and then setting the supply voltage equal to the sum of the average forward voltage of the LEDs and a multiple of the adjusted standard deviation of the forward voltage.

11. The system of claim 10 further comprising one of an analog control circuit coupled to said voltage reference that control on, off and dimming of the light emitting elements in the strings thereof.

12. The system of claim 10 further comprising one of a digital control circuit coupled to said voltage reference that control on, off and dimming of the light emitting elements in the strings thereof.

13. A system for driving light emitting elements, comprising:
a plurality of strings of light emitting elements;
a plurality of current sources connected in parallel with each other, each of said current sources for providing current to one of said strings of light emitting elements;

a voltage reference connected to said plurality of parallel-connected current sources for driving current from each of said current sources through a respective one of said strings of light emitting elements;

a plurality of excess voltage take-up elements each connected in series between one of said current sources and one of said strings of light emitting elements;

a digital control circuit coupled to said voltage reference that controls on, off and dimming of the light emitting elements in the strings; and one or more elements coupled to said current sources that produce delay, in the form of a phase shifted time sequence, of the response of the current sources to the provision of the voltage reference in the digital manner.

14. The system of claim 10 wherein said voltage reference includes a circuit that converts a source of voltage supply from AC to DC voltage.

15. The system of claim 10 further comprising one or more elements coupled in parallel with one or more of the light emitting elements in each of the strings that bypass current relative thereto in response to occurrence of an open circuit failure at the at least one of the light emitting elements.

16. The system of claim 10 wherein said strings of light emitting elements are provided on separate circuit boards so as to produce modular configurations thereof.

17. The system of claim 16 further comprising a microcontroller for controlling on, off and dimming of the light emitting elements in the strings thereof on the separate circuit boards.

18. The system of claim 13 wherein supply voltage for the one or more strings of LEDs is determined by multiplying standard deviations of forward voltages of the LEDs by square root of the maximum number of LEDs per string to yield an adjusted standard deviation and then setting the supply voltage equal to the sum of the average forward voltage of the LEDs and a multiple of the adjusted standard deviation of the forward voltage.

19. The method of claim 4 wherein said providing the voltage reference includes converting a source of voltage supply from AC to DC voltage.

20. The method of claim 4 further comprising bypassing current relative to at least one of the light emitting elements in each of the strings in response to occurrence of an open circuit failure at the at least one of the light emitting elements.

21. The method of claim 4 further comprising providing the strings of light emitting elements on separate circuit boards so as to produce modular configurations thereof.

22. The method of claim 21 further comprising providing a microcontroller for controlling on, off and dimming of the light emitting elements in the strings thereof on the separate circuit boards.

23. The system of claim 13 wherein said voltage reference includes a circuit that converts a source of voltage supply from AC to DC voltage.

24. The system of claim 13 further comprising one or more elements coupled in parallel with one or more of the light emitting elements in each of the strings that bypass current relative thereto in response to occurrence of an open circuit failure at the at least one of the light emitting elements.

25. The system of claim 13 wherein said strings of light emitting elements are provided on separate circuit boards so as to produce modular configurations thereof.

26. The system of claim 25 further comprising a microcontroller for controlling on, off and dimming of the light emitting elements in the strings thereof on the separate circuit boards.

* * * * *